(12) United States Patent
Tada

(10) Patent No.: US 12,494,511 B2
(45) Date of Patent: Dec. 9, 2025

(54) SECONDARY BATTERY

(71) Applicant: Vehicle Energy Japan Inc., Hitachinaka (JP)

(72) Inventor: Akinori Tada, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 671 days.

(21) Appl. No.: 17/299,494

(22) PCT Filed: Dec. 5, 2019

(86) PCT No.: PCT/JP2019/047576
§ 371 (c)(1),
(2) Date: Jun. 3, 2021

(87) PCT Pub. No.: WO2020/188902
PCT Pub. Date: Sep. 24, 2020

(65) Prior Publication Data
US 2022/0085421 A1   Mar. 17, 2022

(30) Foreign Application Priority Data
Mar. 20, 2019   (JP) ................................ 2019-052050

(51) Int. Cl.
*H01M 10/0587*   (2010.01)
*H01M 50/147*   (2021.01)
(Continued)

(52) U.S. Cl.
CPC ..... *H01M 10/0587* (2013.01); *H01M 50/147* (2021.01); *H01M 50/40* (2021.01);
(Continued)

(58) Field of Classification Search
None
See application file for complete search history.

(56) References Cited

U.S. PATENT DOCUMENTS

| 10,158,107 | B2 * | 12/2018 | Kusama | ............. H01M 50/176 |
| 2016/0293921 | A1 | 10/2016 | Kusama et al. | |
| 2017/0324070 | A1 | 11/2017 | Toshiro et al. | |

FOREIGN PATENT DOCUMENTS

| CN | 106058080 A | 10/2016 |
| CN | 107078337 A | 8/2017 |

(Continued)

OTHER PUBLICATIONS

First Office Action dated Oct. 8, 2022 issued in CN Application No. 201980079452.4, with English translation, 21 pages.

(Continued)

*Primary Examiner* — Tracy M Dove
(74) *Attorney, Agent, or Firm* — FOLEY & LARDNER LLP

(57) ABSTRACT

Provided is a secondary battery that enables an air tightness of a battery container to be ensured with more certainty compared with a conventional one. A secondary battery 100 includes a wound body 30, a pair of current collector plates 40, a battery can 11, a battery lid 12, an insulating plate 14, an insulating sheet 50, and a pair of external terminals 20, and an end portion 50e of the insulating sheet 50 adjacent to the battery lid 12 is secured to the insulating plate 14.

14 Claims, 12 Drawing Sheets

(51) Int. Cl.
- *H01M 50/40* (2021.01)
- *H01M 50/593* (2021.01)
- *H01M 50/176* (2021.01)
- *H01M 50/533* (2021.01)
- *H01M 50/586* (2021.01)

(52) U.S. Cl.
CPC ........ *H01M 50/593* (2021.01); *H01M 50/176* (2021.01); *H01M 50/533* (2021.01); *H01M 50/586* (2021.01)

(56) References Cited

FOREIGN PATENT DOCUMENTS

| | | |
|---|---|---|
| JP | 2015-011895 A | 1/2015 |
| JP | 2015-041523 A | 3/2015 |
| JP | 2015-103277 A | 6/2015 |
| JP | 2015-213042 A | 11/2015 |
| JP | 2016-197555 A | 11/2016 |
| JP | 2018-056085 A | 4/2018 |
| WO | WO-2016/088506 A1 | 6/2016 |

OTHER PUBLICATIONS

Second Office Action dated Jul. 27, 2023 issued in corresponding Chinese Patent Application No. 201980079452.4, 12 pages.
Extended European Search Report dated Oct. 17, 2023 issued in EP Application No. 19919560.3, 7 pages.

\* cited by examiner

SECONDARY BATTERY

TECHNICAL FIELD

This disclosure relates to a secondary battery.

BACKGROUND ART

There has been conventionally known an invention regarding a chargeable and dischargeable square secondary battery (see the following Patent Literature 1). In the square secondary battery described in Patent Literature 1, a flat-shaped wound group and current collector plates connected to the wound group are covered with an insulating protection film and housed in a battery can. This conventional square secondary battery has a feature that a heat-resistant film is disposed between the insulating protection film and the current collector plates (see claim 1 and the like in the literature).

The above-described conventional square secondary battery has the above-described configuration, thus allowing providing an excellent effect that melting of the insulating protection film can be avoided without decreasing insertability of the wound group into the battery can, thereby improving an insulation reliability (see paragraph 0008 and the like in the literature).

CITATION LIST

Patent Literature

Patent Literature 1: JP 2015-103277 A

SUMMARY OF INVENTION

Technical Problem

In the above-described conventional square secondary battery, the insulating protection film includes one sheet or a plurality of film members made of synthetic resin and is wound around a peripheral area of the wound group in a direction that is along a flat surface of the wound group and perpendicular to a winding axis direction of the wound group as the central axis direction (see the paragraph 0022, FIG. 2, and the like in the literature).

However, when the wound group where the insulating protection film is wound is inserted into the battery can, a contact with the battery can displaces the insulating protection film to the battery lid side to be possibly sandwiched between the battery lid and the battery can. When the battery lid and the battery can are welded in such a state, the welding between the battery lid and the battery can is insufficient, and an air tightness of a battery container is possibly decreased.

This disclosure provides a secondary battery that enables the air tightness of a battery container to be ensured with more certainty compared with the conventional one.

Solution to Problem

An aspect of the disclosure is a secondary battery that includes: a wound body in which a positive electrode and a negative electrode are wound with separators interposed; a respective pair of current collector plates connected to the positive electrode and the negative electrode; a battery can that houses the wound body and the current collector plates; a battery lid joined to an opening of the battery can; an insulating plate disposed between the current collector plates and the battery lid; an insulating sheet that covers the wound body and the current collector plates inside the battery can; and a pair of external terminals that are connected to the respective current collector plates, pass through the insulating plate and the battery lid, and are exposed to an outside of the battery lid, wherein the insulating sheet has an end portion adjacent to the battery lid, and the end portion is secured to the insulating plate.

Advantageous Effects of Invention

The above-described one aspect of this disclosure can avoid sandwiching the end portion of the insulating sheet between the battery lid and the battery can. This can provide the secondary battery that enables the air tightness of the battery container constituted by the battery lid and the battery can so as to be ensured with more certainty compared with the conventional one.

DESCRIPTION OF EMBODIMENTS

The following describes the embodiments of the secondary battery according to this disclosure with reference to the drawings.

Embodiment 1

Figure 1:
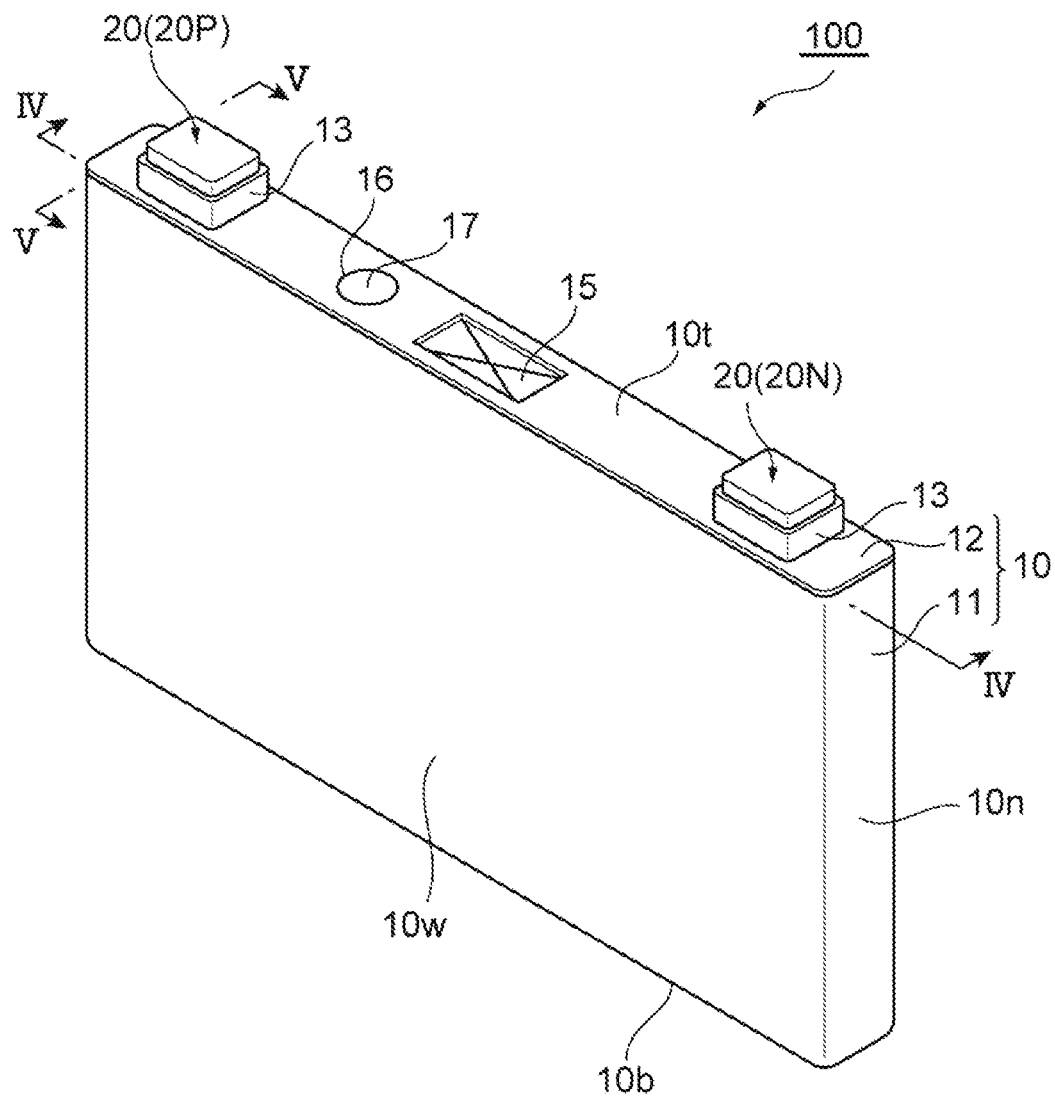
FIG. 1 is a perspective view of a secondary battery according to Embodiment 1 of this disclosure.
Figure 2:
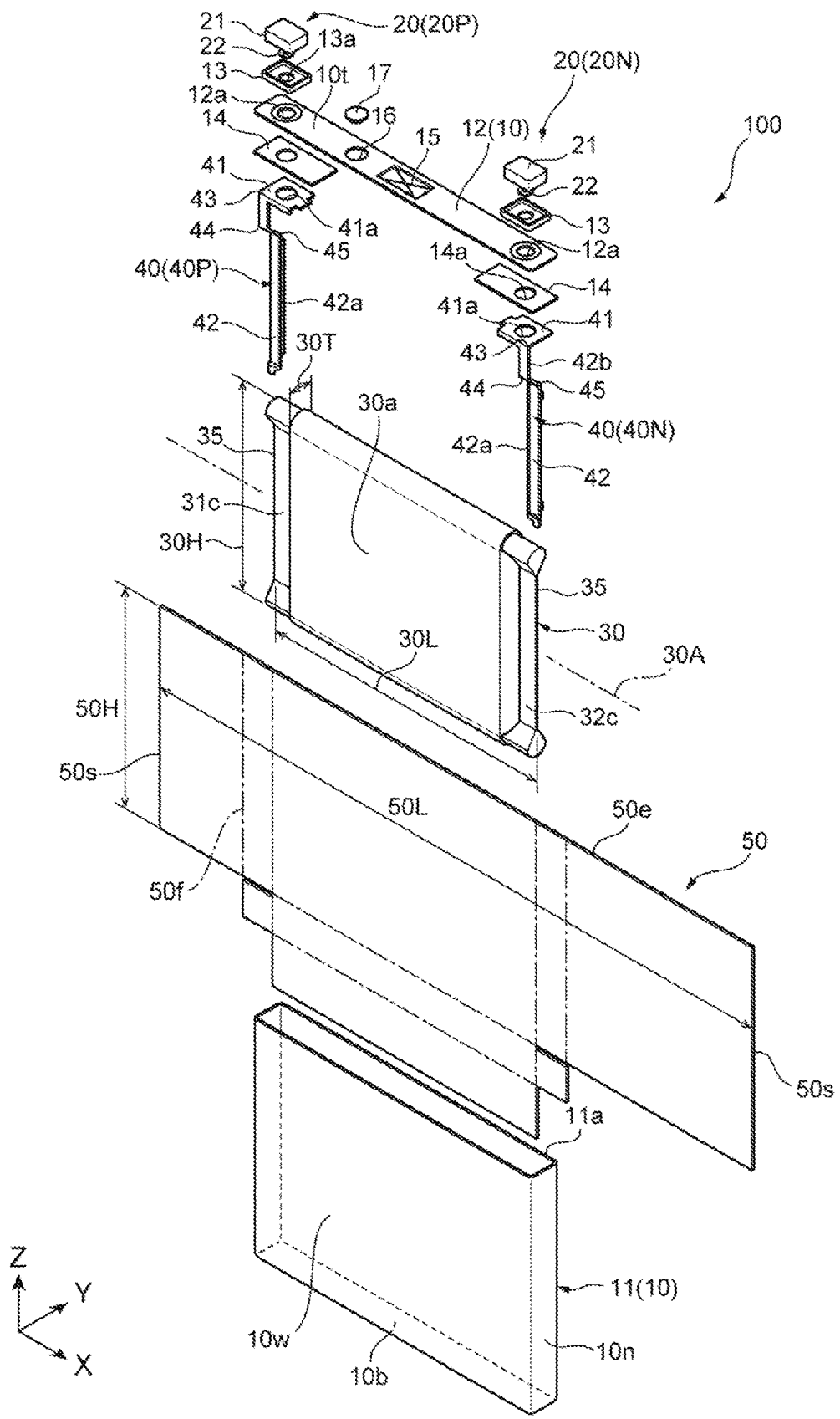
FIG. 2 is an exploded perspective view of the secondary battery illustrated in FIG. 1.
Figure 3:
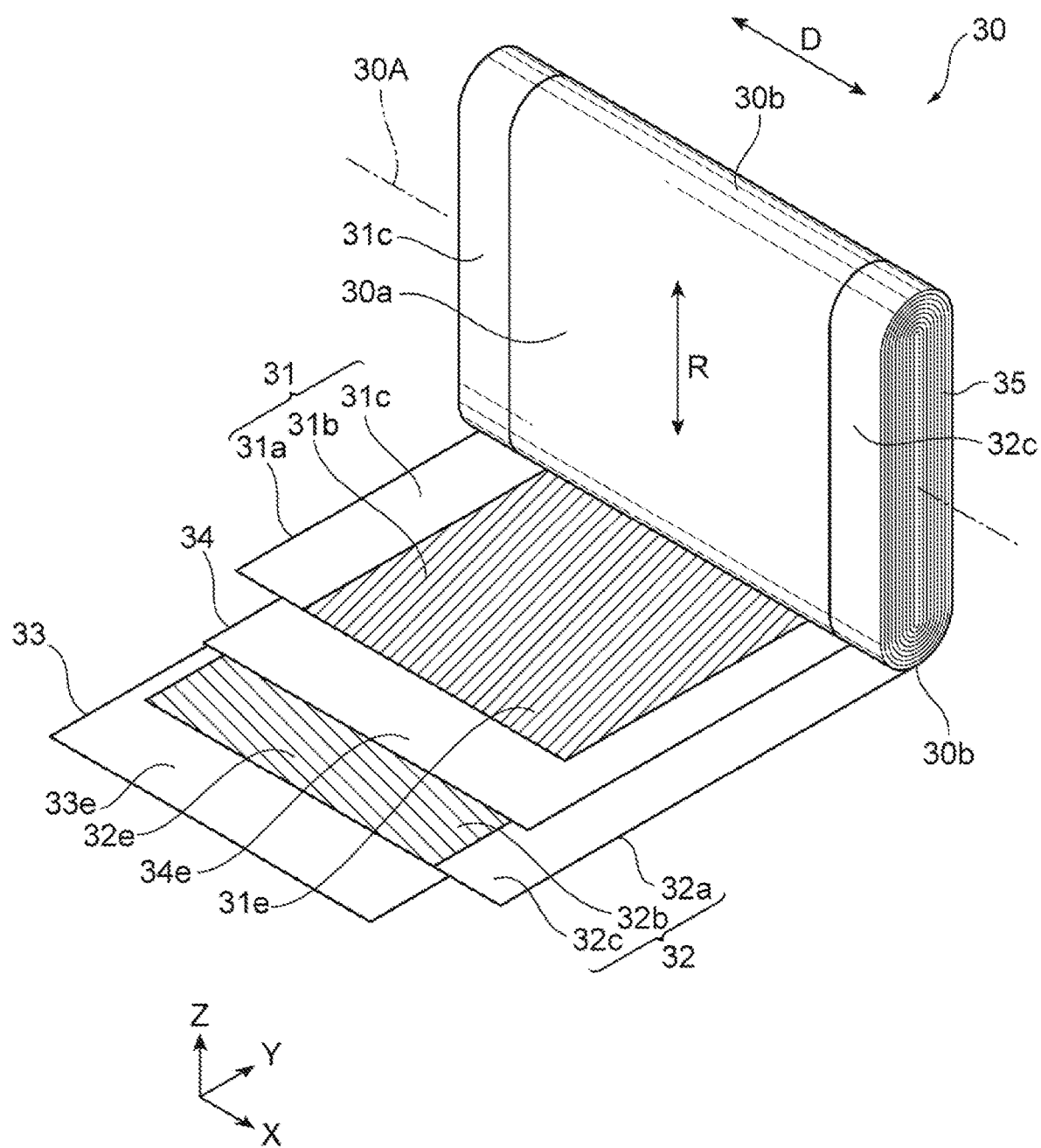
FIG. 3 is an exploded perspective view of a wound body of the secondary battery illustrated in FIG. 2.
Figure 4:
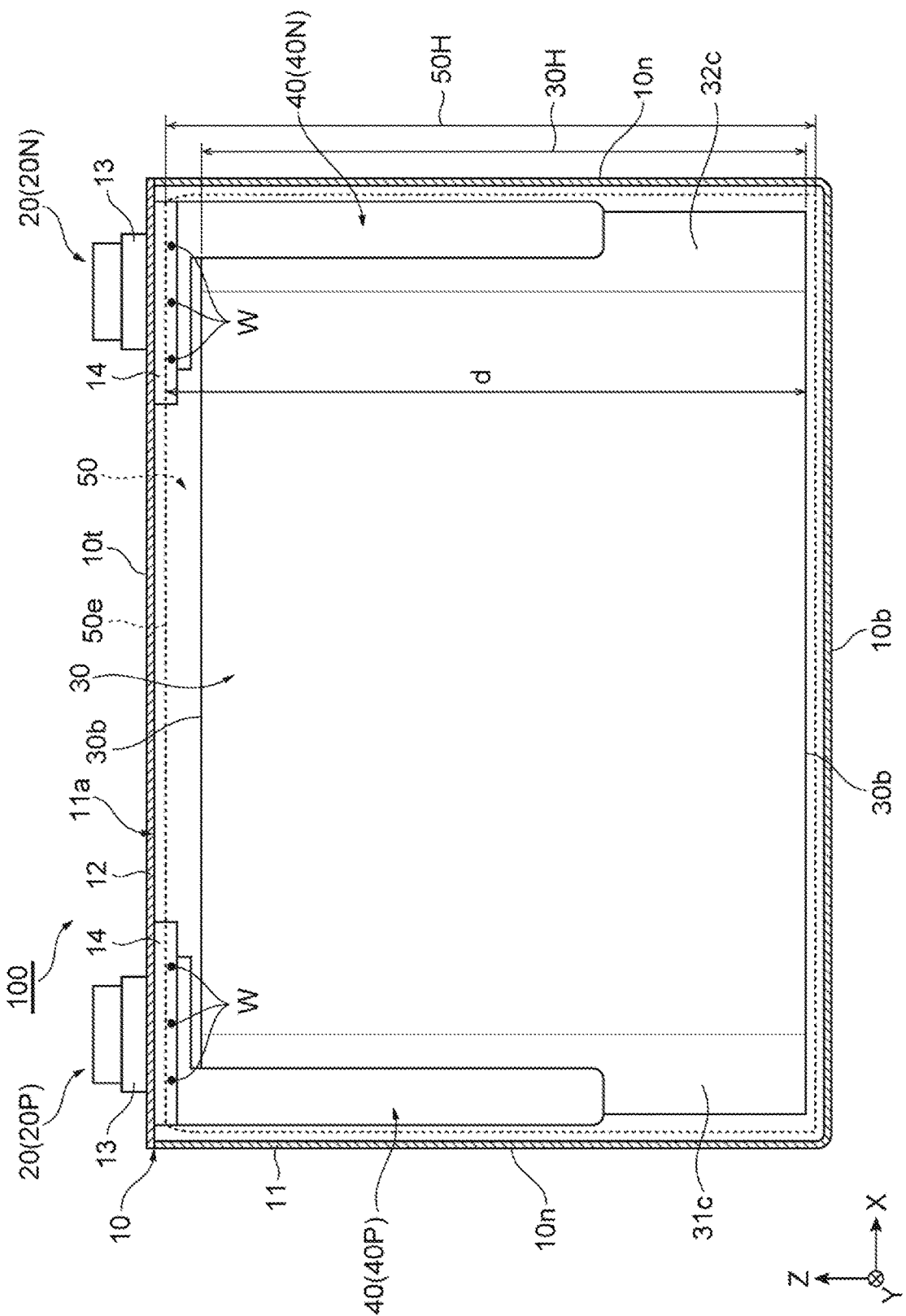
FIG. 4 is a schematic cross-sectional view taken along the line IV-IV of the secondary battery illustrated in FIG. 1.
Figure 5:
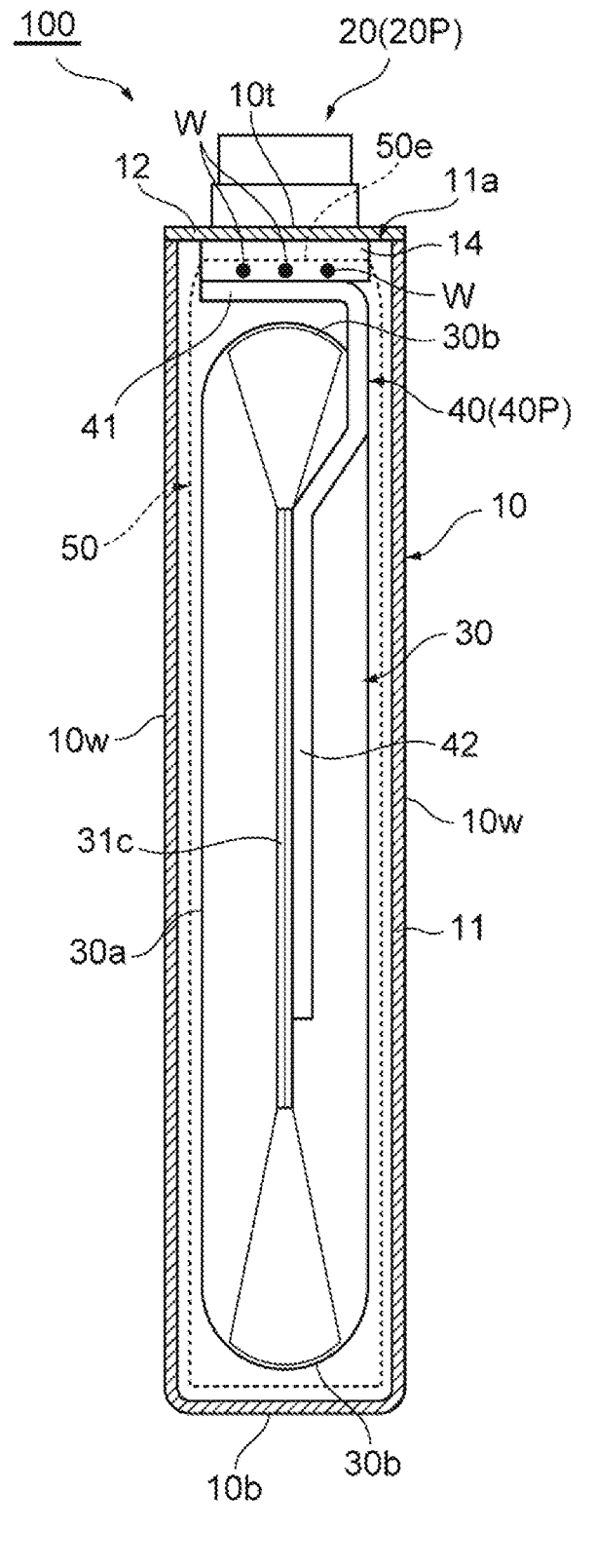
FIG. 5 is a schematic cross-sectional view taken along the line V-V of the secondary battery illustrated in FIG. 1.

FIG. 1 is a perspective view of a secondary battery 100 according to Embodiment 1 of this disclosure. FIG. 2 is an exploded perspective view of the secondary battery 100 illustrated in FIG. 1. FIG. 3 is an exploded perspective view of a wound body 30 of the secondary battery 100 illustrated in FIG. 2. FIG. 4 is a schematic cross-sectional view taken along the line IV-IV of the secondary battery 100 illustrated in FIG. 1. FIG. 5 is a schematic cross-sectional view taken along the line V-V of the secondary battery 100 illustrated in FIG. 1. In FIG. 4 and FIG. 5, in order to clarify the positional relationships between respective portions of the secondary battery 100 and an insulating sheet 50, only an outer shape of the insulating sheet 50 is illustrated by the dashed line.

The secondary battery 100 of this embodiment is a square secondary battery for vehicle used for an electric storage device of, for example, an electric vehicle (EV) and a hybrid electric vehicle (HEV). More specifically, the secondary battery 100 is, for example, a square lithium ion secondary battery. The secondary battery 100 is required to ensure an air tightness with more certainty. Although details will be described later, the secondary battery 100 of this embodiment features the following configurations.

The secondary battery 100 includes the wound body 30, a pair of current collector plates 40, a battery can 11, a battery lid 12, insulating plates 14, the insulating sheet 50, and a pair of external terminals 20. In the wound body 30, a positive electrode 31 and a negative electrode 32 are wound with separators 33, 34 interposed. The respective pair of current collector plates 40 are connected to the positive electrode 31 and the negative electrode 32. The battery can 11 houses the wound body 30 and the current collector plates 40. The battery lid 12 is joined to an opening 11a of the battery can 11. The insulating plates 14 are arranged between the current collector plates 40 and the battery lid 12. The insulating sheet 50 covers the wound body 30 and the current collector plates 40 inside the battery can 11. The pair of external terminals 20 are connected to the respective current collector plates 40, pass through the insulating plates 14 and the battery lid 12 to be exposed outside the battery lid 12. The secondary battery 100 has a feature that an end portion 50e of the insulating sheet 50 adjacent to the battery lid 12 is secured to the insulating plates 14.

The following describes the configurations of the respective portions of the secondary battery 100 of this embodiment in detail. In the respective drawings, in some cases, the configurations of the respective portions of the secondary battery 100 are described using a three-dimensional orthogonal coordinate system including X-axis parallel to the width direction of the flat square secondary battery 100, Y-axis parallel to the thickness direction, and Z-axis parallel to the height direction. In the following description, directions, such as up and down, left and right, and front and rear, are directions convenient for describing the configurations of the respective portions of the secondary battery 100 based on the drawings. They are not limited to the vertical direction or the horizontal direction and do not limit the directions of the secondary battery 100 in use.

The secondary battery 100 includes, for example, a battery container 10, the external terminals 20, the wound body 30, the current collector plates 40, and the insulating sheet 50. The battery container 10, for example, is a metallic container having a flat and rectangular box shape. The battery container 10 includes a pair of wide side surfaces 10w along the width direction (X-direction), a pair of narrow side surfaces 10n along the thickness direction (Y-direction), and an elongated rectangular top surface 10t and an elongated bottom surface 10b. Among these wide side surfaces 10w, narrow side surfaces 10n, top surface 10t, and bottom surface 10b, the wide side surface 10w has the largest area.

The battery container 10 includes, for example, the flat square battery can 11 having opened one end in the height direction (Z-direction), and the rectangular-plate-shaped battery lid 12 that closes the opening 11a of the battery can 11. The wound body 30 as an electric storage element is internally inserted into the battery container 10 from the opening 11a of the battery can 11. In the battery container 10, the battery lid 12 is welded over the whole circumference of the opening 11a of the battery can 11 by, for example, laser beam welding, thus sealing the opening 11a of the battery can 11 with the battery lid 12.

On both ends in the longitudinal direction as the width direction (X-direction) of the secondary battery 100, the battery lid 12 is provided with through holes 12a through which the external terminals 20 are partially inserted. The battery lid 12 includes a gas discharge valve 15 at the center portion in the longitudinal direction. The gas discharge valve 15 is a portion having a slit formed by, for example, thinning a part of the battery lid 12 by presswork, and is integrally disposed with the battery lid 12. An increase of an internal pressure of the battery container 10 up to a predetermined pressure causes cleavage of the gas discharge valve 15 to discharge a gas inside the battery container 10, which reduces the internal pressure of the battery container 10 to ensure the safety of the secondary battery 100.

The battery lid 12 includes a liquid injection hole 16, for example, between the through hole 12a and the gas discharge valve 15. The liquid injection hole 16 is provided to inject an electrolyte to an inside of the battery lid 12 and is sealed by joining a liquid injection plug 17 by, for example, laser beam welding after injecting the electrolyte. As a nonaqueous electrolyte to be injected into the battery container 10, for example, a nonaqueous electrolyte in which a lithium salt, such as lithium hexafluorophosphate ($LiPF_6$), is dissolved in a carbonate ester based organic solvent, such as ethylene carbonate, can be used.

The pair of external terminals 20 are separately disposed in the longitudinal direction of an outer surface of the battery lid 12, that is, the top surface 10t of the battery container 10, pass through the battery lid 12, and are connected to respective base portions 41 of the pair of current collector plates 40 inside the battery container 10. The external terminals 20 include a positive electrode external terminal 20P and a negative electrode external terminal 20N. A material of the positive electrode external terminal 20P is, for example, aluminum or an aluminum alloy. A material of the negative electrode external terminal 20N is, for example, copper or a copper alloy.

The external terminals 20 include, for example, joint portions 21 to be joined to busbars and connecting portions 22 to be connected to the current collector plates 40. The joint portions 21 have rectangular block shapes in approximately rectangular parallelepiped shapes and are disposed in the outer surface of the battery lid 12, that is, the top surface 10t of the battery container 10 via gaskets 13 having an electrical insulating property. The connecting portion 22 is a column-shaped or cylindrical-shaped portion extending in a direction passing through the battery lid 12 from a bottom surface of the joint portion 21 opposed to the battery lid 12.

As illustrated in FIG. 2, the current collector plates 40 are plate-shaped members bent in a predetermined shape and are connected to the wound body 30. The current collector plates 40 includes a positive electrode current collector plate 40P that connects the positive electrode 31 and the positive electrode external terminal 20P, and a negative electrode current collector plate 40N that connects the negative electrode 32 and the negative electrode external terminal 20N. A material of the positive electrode current collector plate 40P is, for example, aluminum or an aluminum alloy. A material of the negative electrode current collector plate 40N is, for example, copper or a copper alloy.

The current collector plates 40 include, for example, the base portions 41 connected to the external terminals 20, extending portions 42 extending in a direction intersecting the base portions 41, and bent portions 43 disposed between joint portions 42a of the extending portions 42 joined to the wound body 30 and the base portions 41. The base portions 41 are disposed along an inner surface of the battery lid 12, and the extending portions 42 extend toward a direction perpendicular to the inner surface of the battery lid 12. The joint portion 42a of the extending portion 42 is joined by, for example, ultrasonic joining to a laminated portion 35 in which a positive electrode current collector portion 31c or a negative electrode current collector portion 32c of the wound body 30 is wounded and flatly laminated.

The wound body 30 includes, for example, the positive electrode 31, the negative electrode 32, and the first separator 33 and the second separator 34 as insulators that insulate these electrodes. The wound body 30 is a wound electrode group having a configuration where the first separator 33, the positive electrode 31, the second separator 34, and the negative electrode 32 are laminated and wound in a winding direction R. The wound body 30 is formed in a flat shape to be housed in the flat square battery can 11, and includes a flat portion 30a and a pair of curving portions 30b disposed on both ends of the flat portion 30a.

In the flat portion 30a, the positive electrode 31, the negative electrode 32, and the separators 33, 34 are wound in a planar shape approximately parallel to the width direction (X-direction) and the height direction (Z-direction) of the secondary battery 100. On the other hand, in the curving portions 30b, the positive electrode 31, the negative electrode 32, and the separators 33, 34, which constitute the wound body 30, are curved and wound in a semi-cylindrical shape having an axis approximately parallel to the width direction of the secondary battery 100, that is, a winding axis 30A as the center. In the wound body 30, for example, the electrode wound around the innermost periphery and the outermost periphery is the negative electrode 32, and the first separator 33 is further wound around an outer periphery of the negative electrode 32 wound around the outermost periphery.

The negative electrode 32 includes a negative electrode current collector foil 32a, negative electrode mixture layers 32b formed on both its front and back surfaces, and the negative electrode current collector portion 32c as a portion where the negative electrode current collector foil 32a is exposed from the negative electrode mixture layers 32b. The negative electrode current collector portion 32c of the negative electrode 32 is disposed on one side in the width direction (X-direction) of the long strip-shaped negative electrode 32, that is, a winding axis direction D of the wound body 30. As the negative electrode current collector foil 32a, for example, a copper foil having a thickness of approximately 6 μm to approximately 12 μm can be used, and it is preferably an electrolytic copper foil of about 8 μm.

The negative electrode mixture layers 32b are formed by, for example, applying a slurry negative electrode mixture to both the front and back surfaces of the negative electrode current collector foil 32a excluding the negative electrode current collector portion 32c, and drying the applied negative electrode mixture and pressing them. Subsequently, the negative electrode current collector foil 32a on which the negative electrode mixture layers 32b are formed is appropriately cut, thereby allowing fabricating the negative electrode 32. The negative electrode mixture layers 32b have a thickness excluding the negative electrode current collector foil 32a of, for example, about 70 μm.

The slurry of the negative electrode mixture can be prepared, for example, as follows. 10 parts by weight of polyvinylidene fluoride (PVDF) as a binder is added to 100 parts by weight of an amorphous carbon powder as a negative electrode active material. One obtained by adding N-methyl pyrrolidone (NMP) as a dispersing solvent to this mixture and mixing it can be used as the slurry of the negative electrode mixture.

Note that the negative electrode active material included in the negative electrode mixture layer 32b is not limited to the above-described amorphous carbon. For example, as the negative electrode active material, natural graphite, various kinds of artificial graphite materials, a carbonaceous material, such as coke, a compound of Si, Sn, and the like (for example, $SiO$ and $TiSi_2$), or a composite material of these substances into which lithium ions can be intercalated or from which lithium ions can be desorbed may be used. A particle shape of the negative electrode active material is not especially limited and may be a scaly shape, a spherical shape, a fiber shape, a lump shape, and the like.

The positive electrode 31 includes a positive electrode current collector foil 31a as a positive electrode current collector, positive electrode mixture layers 31b formed on both its front and back surfaces, and the positive electrode current collector portion 31c as a portion where the positive electrode current collector foil 31a is exposed from the positive electrode mixture layers 31b. The positive electrode current collector portion 31c of the positive electrode 31 is disposed on one side on a side opposite to the negative electrode current collector portion 32c of the negative electrode 32 in the width direction (X-direction) of the long strip-shaped positive electrode 31, that is, the winding axis direction D of the wound body 30. As the positive electrode current collector foil 31a, for example, an aluminum foil having a thickness of approximately 10 μm to approximately 20 μm can be used, and it is preferably an aluminum foil having a thickness of about 15 μm.

The positive electrode mixture layers 31b are formed by, for example, applying a slurry positive electrode mixture to both the front and back surfaces of the positive electrode current collector foil 31a excluding the positive electrode current collector portion 31c, and drying the applied positive electrode mixture and pressing them. Subsequently, the positive electrode current collector foil 31a on which the positive electrode mixture layers 31b are formed is appropriately cut, thereby allowing fabricating the positive electrode 31. The positive electrode mixture layers 31b have a thickness excluding the positive electrode current collector foil 31a of, for example, about 90 μm.

The slurry of the positive electrode mixture can be prepared, for example, as follows. 10 parts by weight of scaly graphite as a conductive material and 10 parts by weight of PVDF as a binder are added to 100 parts by weight of lithium manganate (chemical formula: $LiMn_2O_4$) as a positive electrode active material. One obtained by adding NMP as a dispersing solvent to this mixture and mixing it can be used as the slurry of the positive electrode mixture.

Note that the positive electrode active material included in the positive electrode mixture layer 31b is not limited to the above-described lithium manganate. As the positive electrode active material, for example, another lithium manganate having a spinel crystal structure, and a lithium manganese composite oxide partially replaced or doped with a metallic element can be used. Additionally, as the positive electrode active material, a lithium cobaltate or a lithium titanate that has a layered crystal structure, and a lithiummetal composite oxide in which a part of these substances is replaced or doped with a metallic element may be used.

The binder used for the negative electrode mixture and the positive electrode mixture is not limited to PVDF. As the binder, for example, a polymer, such as polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various kinds of latexes, acrylonitrile, vinyl fluoride, vinylidene fluoride, propylene fluoride, chloroprene fluoride, and acrylic-based resin, and a mixture of these substances can be used.

The separators 33, 34 are made of, for example, porous polyethylene resin or polypropylene resin, or a composite resin thereof and are interposed between the positive electrode 31 and the negative electrode 32 to electrically insulate them. In addition, the separators 33, 34 are wound around an outside of the negative electrode 32 wound around the outermost periphery. Although the illustration is omitted, the wound body 30 may include a winding core for laminating the negative electrode 32, the first separator 33, the positive electrode 31, and the second separator 34 to wind them.

As the winding core, for example, one obtained by winding a resin sheet having a flexural rigidity higher than those of the positive electrode current collector foil 31a, the negative electrode current collector foil 32a, and the separators 33, 34 can be used. The wound body 30 is configured such that dimensions of the negative electrode mixture layers 32b in the winding axis direction D (X-direction) are larger than dimensions of the positive electrode mixture layers 31b while the positive electrode mixture layers 31b are always sandwiched between the negative electrode mixture layers 32b.

In the wound body 30, as illustrated in FIG. 3, each of the positive electrode current collector portion 31c of the positive electrode 31 and the negative electrode current collector portion 32c of the negative electrode 32 is wound to be laminated on one end and the other end in the winding axis direction D (X-direction). Furthermore, as illustrated in FIG. 2, each of the positive electrode current collector portion 31c and the negative electrode current collector portion 32c is flatly bundled and is joined to the joint portions 42a of the extending portions 42 of the current collector plates 40 by, for example, ultrasonic joining or resistance welding.

In the winding axis direction D (X-direction), dimensions of the separators 33, 34 are larger than the dimensions of the negative electrode mixture layers 32b. However, the separators 33, 34 have end portions each disposed at an inner position in the winding axis direction D (X-direction) with respect to end portions of the positive electrode current collector portion 31c and the negative electrode current collector portion 32c. Therefore, this does not obstruct bundling the positive electrode current collector portion 31c and the negative electrode current collector portion 32c and joining them to the joint portions 42a of the extending portions 42 of the positive electrode current collector plate 40P and the negative electrode current collector plate 40N, respectively.

As illustrated in FIG. 2 and FIG. 4, the secondary battery 100 of this embodiment includes, for example, the pair of insulating plates 14 separately disposed on the one end and the other end in the longitudinal direction of the battery lid 12, that is, the width direction (X-direction) of the secondary battery 100. More specifically, among the pair of insulating plates 14, one insulating plate 14 is disposed between the positive electrode external terminal 20P and the positive electrode current collector plate 40P, and the other insulating plate 14 is disposed between the negative electrode external terminal 20N and the negative electrode current collector plate 40N. There is a space where the insulating plate 14 is not disposed between the pair of insulating plates 14.

The base portions 41 of the current collector plates 40 are secured to the battery lid 12 via the insulating plates 14 and electrically connected to the external terminals 20. More specifically, the connecting portions 22 of the external terminals 20 are inserted through, for example, through holes 13a of the gaskets 13, the through holes 12a of the battery lid 12, through holes 14a of the insulating plates 14, and through holes 41a of the base portions 41 of the current collector plates 40. The connecting portions 22 of the external terminals 20 are plastically deformed to be caulked while the distal ends are radially expanded on lower surfaces of the base portions 41 of the current collector plates 40.

Thus, the external terminals 20 and the current collector plates 40 are secured in a state of being electrically connected to one another and being electrically insulated from the battery lid 12 via the gaskets 13 and the insulating plates 14, thus being assembled as a lid assembly. A material of the gasket 13 and the insulating plate 14 is, for example, a resin having an electrical insulating property, such as polybutylene terephthalate, polyphenylene sulfide, and perfluoroalkoxy fluororesin.

In the assembled lid assembly, the joint portions 42a of the extending portions 42 of the current collector plates 40 are joined to the respective laminated portions 35 of the positive electrode current collector portion 31c and the negative electrode current collector portion 32c of the wound body 30. Thus, the positive electrode 31 and the negative electrode 32, which constitute the wound body 30, are electrically connected to the external terminals 20 via the current collector plates 40. The wound body 30 is joined to the current collector plates 40, thereby being secured to the battery lid 12 via the current collector plates 40 and electrically connected to the external terminals 20. In this state, the wound body 30 is covered with the resin insulating sheet 50 having an electrical insulating property, and inserted into the battery can 11 from the opening 11a of the battery can 11.

The insulating sheet 50 is one sheet made of a material, for example, a synthetic resin, such as polypropylene. Although the illustration is omitted, the insulating sheet 50 may have, for example, a plurality of partial insulating sheets. The insulating sheet 50 has dimensions and a shape that can cover approximately the whole wound body 30 to which the current collector plates 40 have been joined together with the current collector plates 40. The insulating sheet 50 is interposed between the wound body 30 with the current collector plates 40 and the battery can 11, so as to electrically insulate therebetween.

As illustrated in FIG. 4 and FIG. 5, in a state of covering the wound body 30, the insulating sheet 50 covers the wound body 30 over the whole circumference in a circumferential direction of the battery can 11 along an opening edge of the opening 11a of the battery can 11 illustrated in FIG. 2, and end portions 50s, 50s in the circumferential direction of the battery can 11 mutually overlap. More specifically, in a state where the insulating sheet 50 is developed into a plane as illustrated in FIG. 2, a length 50L along the width direction (X-direction) of the secondary battery 100, that is, the winding axis 30A of the wound body 30 is longer than a perimeter of the wound body 30 in the circumferential direction of the battery can 11. Here, the perimeter of the wound body 30 is a length to go around the wound body 30 along outer surfaces of the wound body 30 and the current collector plates 40 and the circumferential direction of the battery can 11 in a state where the respective current collector plates 40 are joined to the positive electrode current collector portion 31c and the negative electrode current collector portion 32c.

More specifically, as illustrated in FIG. 2, in the state where the insulating sheet 50 is developed into the plane, the length 50L of the insulating sheet 50 along the winding axis 30A of the wound body 30 is larger than a sum of: a length twice a length 30L of the wound body 30 in the width direction of the secondary battery 100; and a thickness twice a thickness 30T of the flat portion 30a of the wound body 30. Thus, the insulating sheet 50 covers the whole wound body 30 as illustrated in FIG. 4 and FIG. 5, when, for example, the insulating sheet 50 is folded along broken lines 50f illustrated in FIG. 2. In this state, the insulating sheet 50 has the above-described length SOL and thus covers the wound body 30 over the whole circumference in the circumferential direction of the battery can 11 along the opening edge of the opening 11a of the battery can 11, and the end portions 50s, 50s in the circumferential direction of the battery can 11 mutually overlap. These end portions 50s, 50s of the insulating sheet 50 in the circumferential direction of the battery can 11 are disposed at positions not to overlap with the pair of insulating plates 14. That is, the end portions 50s, 50s of the insulating sheet 50 in the circumferential direction of the battery can 11 are disposed in a space where the insulating plates 14 are not disposed.

In the states illustrated in FIG. 4 and FIG. 5, in the height direction (Z-direction) of the secondary battery 100, a height 50H of the insulating sheet 50 is larger than a height 30H from an apex of one curving portion 30b to an apex of the other curving portion 30b of the wound body 30. In the states illustrated in FIG. 4 and FIG. 5, in the height direction of the secondary battery 100, the height 50H of the insulating sheet 50 is larger than a distance d from a position opposed to side surfaces of the insulating plates 14 to an apex of the curving portion 30b of the wound body 30 adjacent to the bottom surface 10b of the battery container 10. Thus, in the height direction of the secondary battery 100, the insulating sheet 50 covers the whole from the apex of one curving portion 30b to the apex of the other curving portion 30b of the wound body 30. The insulating sheet 50 extends from the apex of one curving portion 30b of the wound body 30 adjacent to the battery lid 12 toward the battery lid 12, and the end portion 50e adjacent to the battery lid 12 is opposed to the side surfaces of the insulating plates 14.

As described above, the secondary battery 100 of this embodiment has a feature that the end portion 50e of the insulating sheet 50 adjacent to the battery lid 12 is secured to the insulating plates 14. More specifically, in the secondary battery 100 of this embodiment, as illustrated in FIG. 4 and FIG. 5, the end portion 50e of the insulating sheet 50 is secured to the insulating plates 14 via welding portions W. The welding portions W are, for example, portions at which the insulating sheet 50 and the insulating plates 14 are integrated to be joined by causing the insulating sheet 50 and the insulating plates 14 made of thermoplastic resin material to be brought in close contact with each other and heating at least one of them up to a temperature exceeding a melting point of the resin material while applying a pressure.

As illustrated in FIG. 4 and FIG. 5, for example, the plurality of point-shaped welding portions W are disposed at intervals along the circumferential direction of the battery can 11 along the opening edge of the opening 11a of the battery can 11. More specifically, for example, as illustrated in FIG. 4, the plurality of welding portions W are disposed on the side surfaces of the insulating plates 14 opposed to the wide side surfaces 10w of the battery container 10 at intervals in the width direction (X-direction) of the secondary battery 100. In the example illustrated in FIG. 4, the three welding portions W are disposed in the width direction of the secondary battery 100 at regular intervals. For example, as illustrated in FIG. 5, the plurality of welding portions W are disposed on the side surfaces of the insulating plates 14 opposed to the narrow side surfaces 10n of the battery container 10 at intervals in the thickness direction (Y-direction) of the secondary battery 100. In the example illustrated in FIG. 5, the three welding portions W are disposed in the thickness direction of the secondary battery 100 at regular intervals.

Note that the welding portions W may be disposed on only the side surfaces of the insulating plates 14 opposed to the narrow side surfaces 10n of the battery container 10 and may be disposed on only the side surfaces of the insulating plates 14 opposed to the wide side surfaces 10w of the battery container 10. The number of the welding portions W to be disposed on each side surface of the insulating plates 14 may be one, and may be two or four or more. The welding portions W do not need to have a point shape, for example, may be disposed to have a line shape along the respective side surfaces of the insulating plates 14, and may be a combination of the point-shaped welding portions W and the line-shaped welding portions W. Furthermore, the welding portions W may be formed between the whole side surfaces of the insulating plates 14 and the end portion 50e of the insulating sheet 50.

As described above, in the secondary battery 100 of this embodiment, in a state where the insulating sheet 50 covers the wound body 30 and the current collector plates 40, the end portion 50e adjacent to the battery lid 12 is secured to the insulating plates 14 via, for example, the welding portions W. Thus, the insulating sheet 50 which covers the wound body 30 and the current collector plates 40, is installed to the lid assembly, which includes the battery lid 12, the gaskets 13, the insulating plates 14, the pair of external terminals 20, the pair of current collector plates 40, and the wound body 30.

This lid assembly is inserted through the opening 11a of the battery can 11 from the curving portion 30b on a lower end of the wound body 30 such that the winding axis direction D of the wound body 30 is along the width direction (X-direction) of the secondary battery 100. This causes the wound body 30 to be in a state where the curving portion 30b on an upper side is opposed to the battery lid 12, and the curving portion 30b on a lower side is opposed to the bottom surface 10b of the battery container 10. The opening 11a of the battery can 11 is closed with the battery lid 12. Subsequently, as described above, the battery lid 12 is joined to the opening 11a of the battery can 11 over the whole circumference to constitute the battery container 10. Subsequently, the electrolyte is injected into the battery container 10 via the liquid injection hole 16, and the liquid injection hole 16 is sealed by joining the liquid injection plug 17.

The above-described configuration enables the secondary battery 100 to connect the external terminals 20 and an external device whose illustration is omitted via the busbars, a cable, and the like whose illustrations are omitted. The secondary battery 100 is charged by supplying electric power from the external device to the external terminals 20 to accumulate electric energy between the positive electrode 31 and the negative electrode 32 of the wound body 30, which are connected to the external terminals 20 via the current collector plates 40. The charged secondary battery 100 enables the respective pair of external terminals 20, which are connected to the positive electrode 31 and the negative electrode 32 of the wound body 30 to which the electric energy has been accumulated via the current collector plates 40, thus generating electromotive force to supply the electric power to the external device.

The following describes actions of the secondary battery 100 of this embodiment.

As described above, the secondary battery 100 of this embodiment includes the following respective configurations: the wound body 30 in which the positive electrode 31 and the negative electrode 32 are wound with the separators 33, 34 interposed; the respective pair of current collector plates 40 connected to the positive electrode 31 and the negative electrode 32; the battery can 11 that houses the wound body 30 and the current collector plates 40; the battery lid 12 joined to the opening 11a of the battery can 11; the insulating plates 14 arranged between the current collector plates 40 and the battery lid 12; the insulating sheet 50 that covers the wound body 30 and the insulating plates 14 inside the battery can 11; and the pair of external terminals 20 that are connected to the respective current collector plates 40, pass through the insulating plates 14 and the battery lid 12, and are exposed to outside of the battery lid 12. The secondary battery 100 of this embodiment has a feature that the insulating sheet 50 has the end portion 50e adjacent to the battery lid 12, and the end portion 50e is secured to the insulating plates 14.

This configuration can avoid sandwiching the end portion 50e of the insulating sheet 50 adjacent to the battery lid 12 between the battery lid 12 and the battery can 11 when the secondary battery 100 is assembled as described above. More specifically, when the secondary battery 100 is assembled, for example, as described above, the lid assembly where the battery lid 12, the gaskets 13, the insulating plates 14, the pair of external terminals 20, the pair of current collector plates 40, and the wound body 30 are integrated is assembled. The insulating sheet 50 is arranged to cover the wound body 30 of this lid assembly, and the end portion 50e of the insulating sheet 50 adjacent to the battery lid 12 is secured to the insulating plates 14. The wound body 30 of the lid assembly, which has been covered with the insulating sheet 50, is inserted into the opening 11a of the battery can 11 from the curving portion 30b on the lower side.

At this time, the insulating sheet 50 covering the wound body 30 contacts an inner surface of the battery can 11, and a force of moving the insulating sheet 50 toward the battery lid 12 possibly acts. However, as described above, in the secondary battery 100 of this embodiment, the end portion 50e of the insulating sheet 50 adjacent to the battery lid 12 is secured to the insulating plates 14. Therefore, movement of the end portion 50e of the insulating sheet 50 adjacent to the battery lid 12 toward the battery lid 12 is avoided, which avoids being sandwiched between the battery lid 12 and the battery can 11. This enables welding between the battery lid 12 and the battery can 11 to be performed with more certainty compared with the conventional one, which ensures the air tightness of the battery container 10 with more certainty compared with the conventional one.

As described above, the secondary battery 100 of this embodiment includes the pair of insulating plates 14, which are separately arranged on the one end and the other end of the battery lid 12.

With this configuration, the end portion 50e of the insulating sheet 50 adjacent to the battery lid 12 is secured to the insulating plates 14 on the one end and the other end of the battery lid 12, thus becoming a free state of not being secured between the pair of insulating plates 14. Accordingly, generation of a crease on the insulating sheet 50 between the pair of insulating plates 14 can be avoided, thus allowing avoiding a damage of the insulating sheet 50. More specifically, as described above, when the wound body 30 covered with the insulating sheet 50 is inserted into the opening 11a of the battery can 11, a force possibly acts from the one end and the other end of the battery lid 12 toward the center portion of the battery lid 12. Even in such a case, the end portion 50e of the insulating sheet 50 adjacent to the battery lid 12 can be relatively freely flexed because of the free state of not being secured between the pair of insulating plates 14, thus allowing avoiding generation of a crease on the end portion 50e of the insulating sheet 50.

In contrast, assume that, for example, the insulating plate 14 is continuous from the one end to the other end of the battery lid 12, and the end portion 50e of the insulating sheet 50 is secured to the side surface of the insulating plate 14 over the whole circumference. In this case, when the force acts on the end portion 50e of the insulating sheet 50 from the one end and the other end of the battery lid 12 toward the center portion of the battery lid 12, the end portion 50e of the insulating sheet 50 cannot be freely flexed, and a crease is possibly generated on the end portion 50e of the insulating sheet 50. Such a crease on the end portion 50e of the insulating sheet 50 concentrates stress that acts on the insulating sheet 50, which possibly damages the insulating sheet 50. On the other hand, with the secondary battery 100 of this embodiment, as described above, the generation of the crease on the end portion 50e of the insulating sheet 50 can be avoided to avoid the damage of the insulating sheet 50.

In the secondary battery 100 of this embodiment, as described above, the insulating sheet 50 covers the wound body 30 over the whole circumference in the circumferential direction of the battery can 11 along the opening edge of the opening 11a of the battery can 11. The insulating sheet 50 is disposed at a position at which the end portions 50s in the circumferential direction do not overlap the pair of insulating plates 14. One end portion 50s and the other end portion 50s of this insulating sheet 50 in the circumferential direction of the battery can 11 mutually overlap.

This configuration enables the insulating sheet 50 to cover the whole circumference of the wound body 30 in the circumferential direction of the battery can 11 and to freely move in the circumferential direction of the battery can 11 to some extent. Therefore, when the wound body 30 covered with the insulating sheet 50 is inserted into the opening 11a of the battery can 11, for example, even when a force in the circumferential direction of the battery can 11 acts on the insulating sheet 50, it can be avoided that the insulating sheet 50 moves in the circumferential direction of the battery can 11 to generate the crease on the insulating sheet 50. Note that when a sufficient insulating property can be ensured, the end portions 50s, 50s of the insulating sheet 50 in the circumferential direction of the battery can 11 do not need to mutually overlap.

In the secondary battery 100 of this embodiment, the insulating sheet 50 includes a plurality of partial insulating sheets in some cases. In other words, the insulating sheet 50 is divided into a plurality of partial insulating sheets in some cases.

In this case, the plurality of partial insulating sheets, which constitute the insulating sheet 50, cover the whole circumference of the wound body 30, and a relative movement between the partial insulating sheet and the partial insulating sheet that are mutually adjacent become allowed. Therefore, when the wound body 30 covered with the insulating sheet 50 is inserted into the opening 11a of the battery can 11, even when a force acts on the insulating sheet 50, it can be avoided that the plurality of partial insulating sheets relatively move to generate the crease on the insulating sheet 50. It is only necessary that the partial insulating sheets each cover a part of the wound body 30. Therefore, the plurality of partial insulating sheets can cover the whole wound body 30 more easily than a case of covering the whole wound body 30 with one insulating sheet 50.

In the secondary battery 100 of this embodiment, the end portion 50e of the insulating sheet 50 is secured to the insulating plates 14 via the welding portions W.

This configuration enables the end portion 50e of the insulating sheet 50 to be secured to the insulating plates 14 by heating and pressurizing at least one of the insulating sheet 50 or the insulating plates 14. The joining of the insulating sheet 50 and the insulating plates 14 via the welding portions W does not require an additional joining material, which is excellent in productivity. Accordingly, the productivity of the secondary battery 100 is improved and the manufacturing cost can be reduced.

As described above, this embodiment can provide the secondary battery 100 that avoids sandwiching the end portion 50e of the insulating sheet 50 between the battery can 11 and the battery lid 12 and enables the air tightness of the battery container 10 to be ensured with more certainty compared with the conventional one.

Embodiment 2

Figure 6:
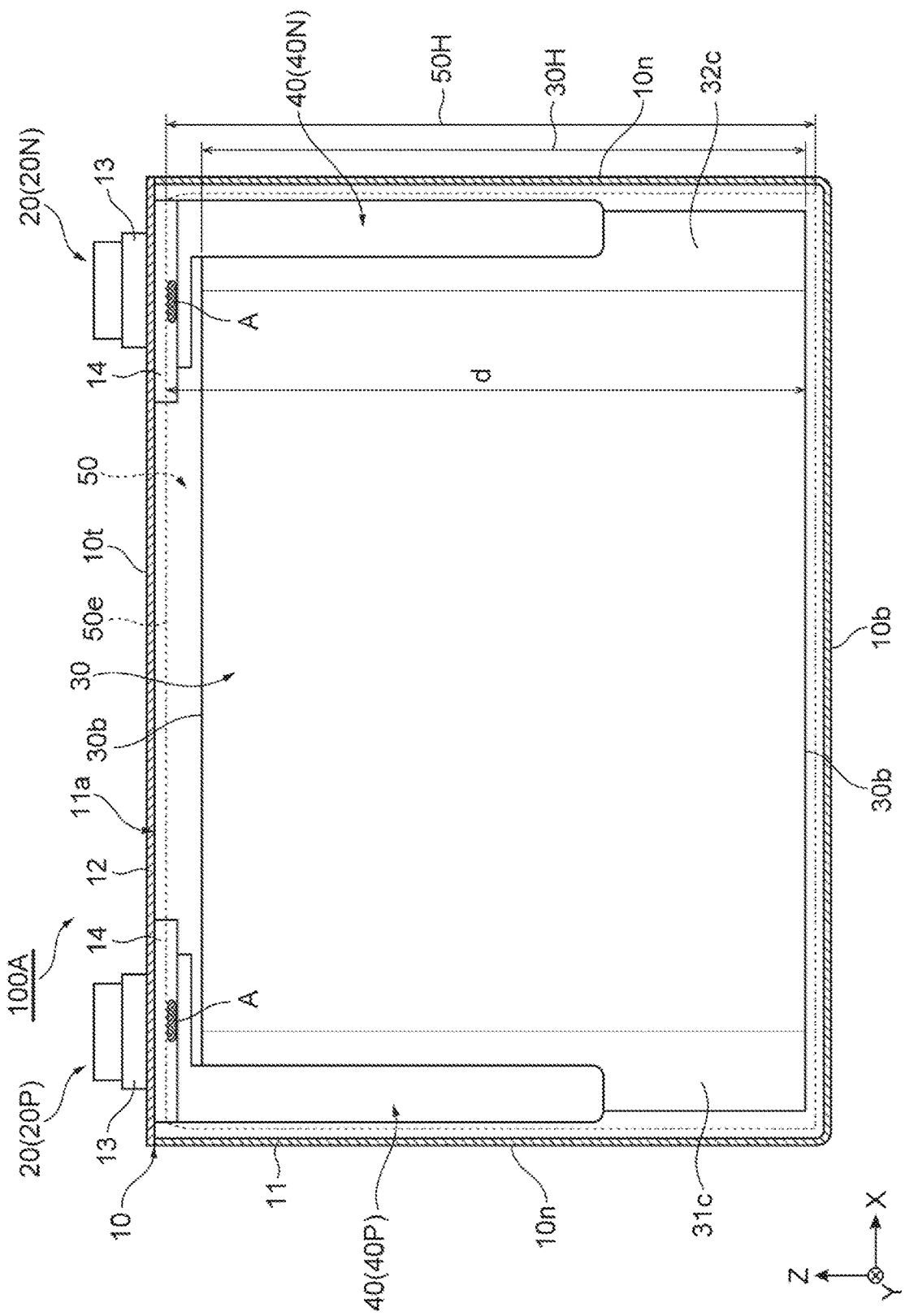
FIG. 6 is a schematic cross-sectional view of a secondary battery according to Embodiment 2 of this disclosure corresponding to FIG. 4.
Figure 7:
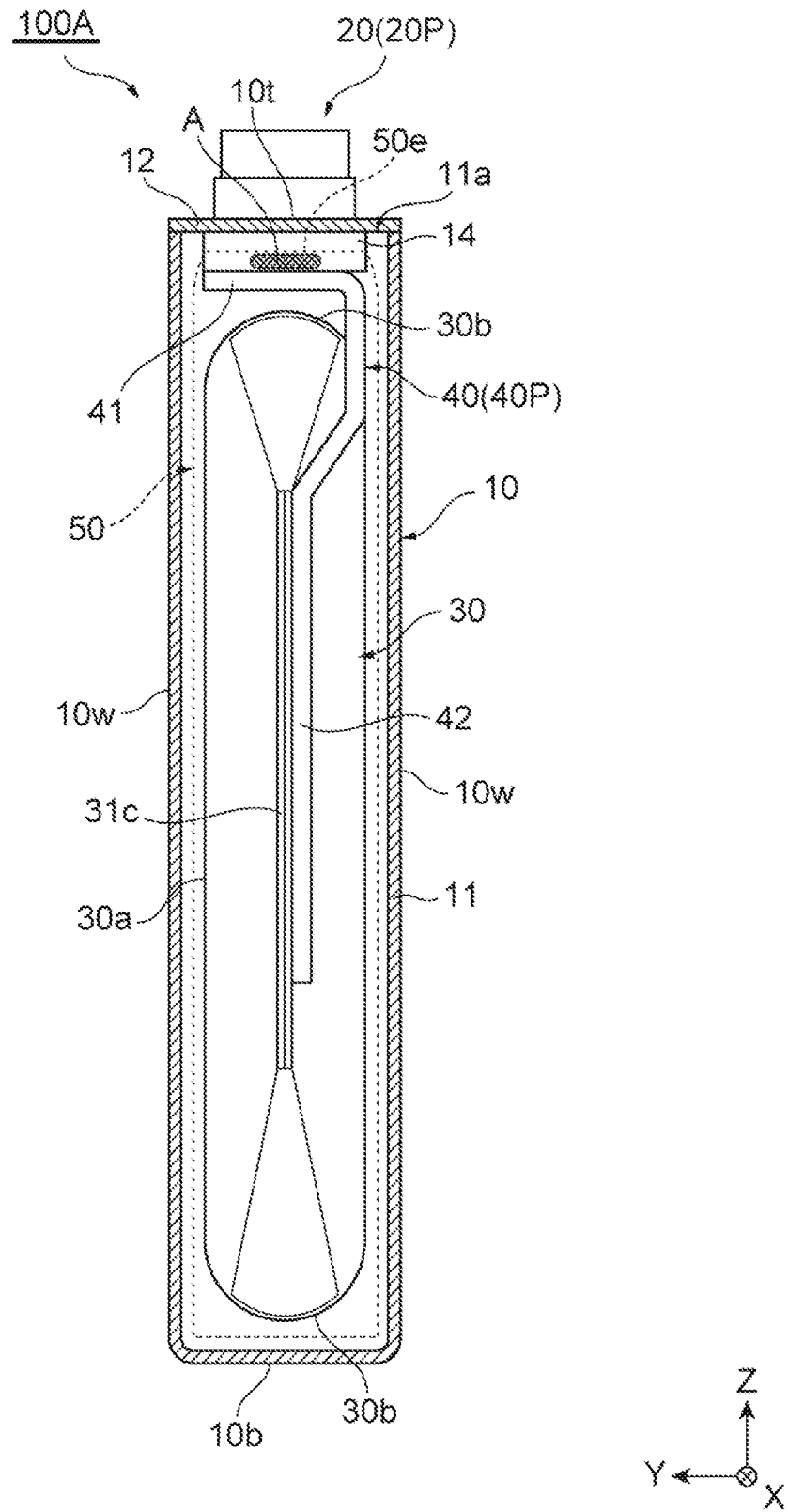
FIG. 7 is a schematic cross-sectional view of the secondary battery according to Embodiment 2 of this disclosure corresponding to FIG. 5.

Next, using FIG. 1 to FIG. 3, Embodiment 2 of the secondary battery of this disclosure will be described with reference to FIG. 6 and FIG. 7. FIG. 6 is a schematic cross-sectional view of a secondary battery 100A according to Embodiment 2 of this disclosure corresponding to FIG. 4. FIG. 7 is a schematic cross-sectional view of the secondary battery 100A according to Embodiment 2 of this disclosure corresponding to FIG. 5.

The secondary battery 100A of this embodiment is different from the secondary battery 100 according to the above-described Embodiment 1 in that the end portion 50e of the insulating sheet 50 is secured to the insulating plates 14 via bonding portions A. Since the other matters of the secondary battery 100A of this embodiment are similar to those of the secondary battery 100 according to the above-described Embodiment 1, the same reference numerals are attached to the same portions, and their descriptions are omitted.

In the secondary battery 100A of this embodiment, the end portion 50e of the insulating sheet 50 is secured to the insulating plates 14 via the bonding portions A. As described above, this can avoid sandwiching the end portion 50e of the insulating sheet 50 adjacent to the battery lid 12 between the battery lid 12 and the battery can 11 when the secondary battery 100A is assembled. Accordingly, similarly to the above-described Embodiment 1, this embodiment can provide the secondary battery 100A that enables the air tightness of the battery container 10 to be ensured with more certainty compared with the conventional one.

The bonding portions A can be formed by, for example, applying an acrylic bonding agent or adhesive agent to at least one of the insulating sheet 50 or the insulating plates 14 and performing drying or curing between the insulating sheet 50 and the insulating plates 14. While, for example, the plurality of bonding portions A may be disposed at intervals in the circumferential direction of the battery can 11 along the opening edge of the opening 11a of the battery can 11, as illustrated in FIG. 6 and FIG. 7, the bonding portions A are preferably disposed to have a line shape, a strip shape, or a planar shape along the side surfaces of the insulating plates 14. This increases bonding areas of the bonding portions A to enable the end portion 50e of the insulating sheet 50 to be more tightly secured to the insulating plates 14. The bonding portions A can be disposed in any combination of two or more among the arrangements of a point shape, a line shape, a strip shape, and a planar shape.

Embodiment 3

Figure 8:
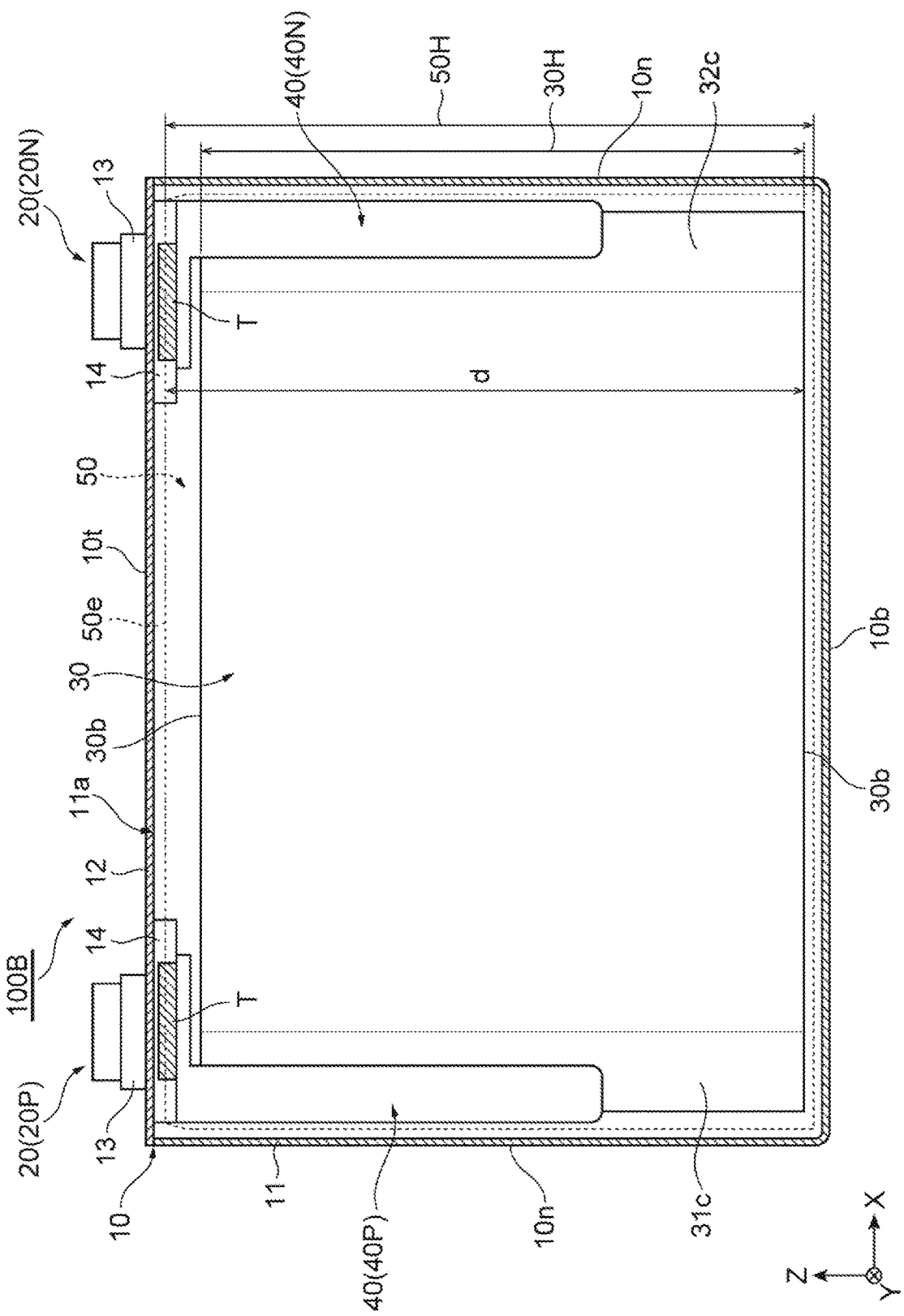
FIG. 8 is a schematic cross-sectional view of a secondary battery according to Embodiment 3 of this disclosure corresponding to FIG. 4.
Figure 9:
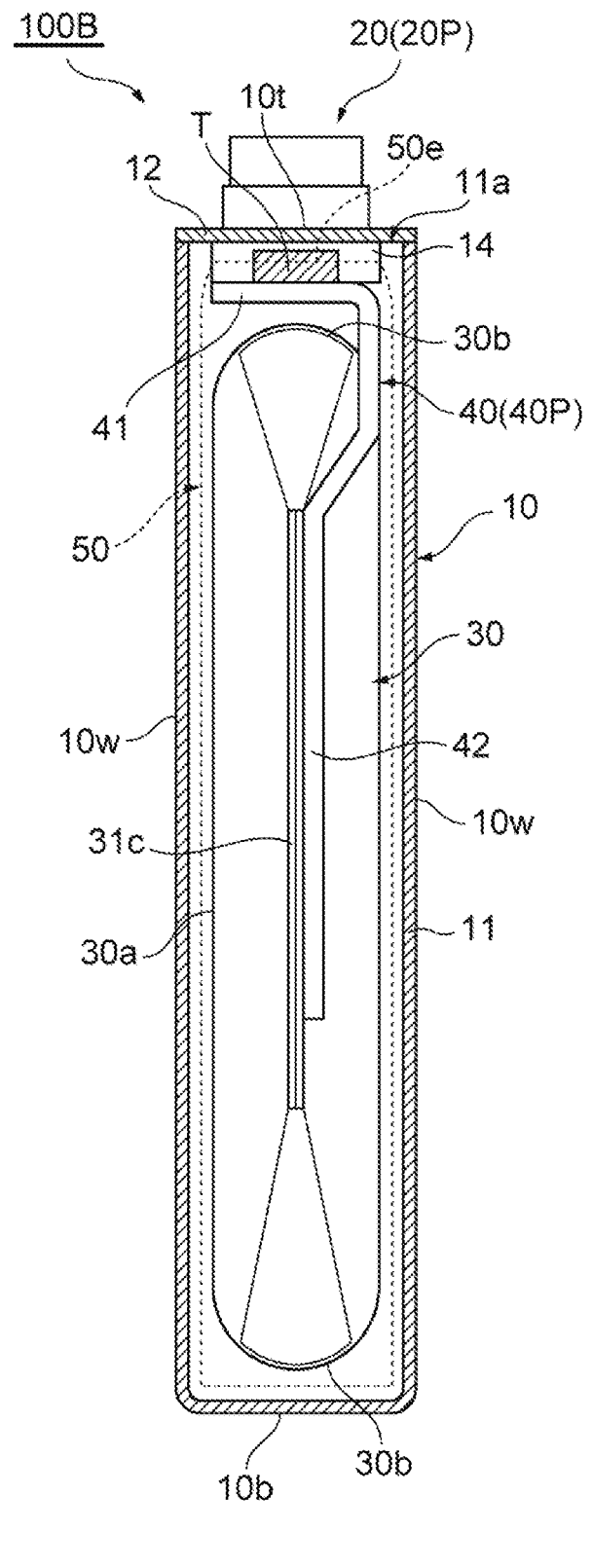
FIG. 9 is a schematic cross-sectional view of the secondary battery according to Embodiment 3 of this disclosure corresponding to FIG. 5.

Next, using FIG. 1 to FIG. 3, Embodiment 3 of the secondary battery of this disclosure will be described with reference to FIG. 8 and FIG. 9. FIG. 8 is a schematic cross-sectional view of a secondary battery 100B according to Embodiment 3 of this disclosure corresponding to FIG. 4. FIG. 9 is a schematic cross-sectional view of the secondary battery 100B according to Embodiment 3 of this disclosure corresponding to FIG. 5.

The secondary battery 100B of this embodiment is different from the secondary battery 100 according to the above-described Embodiment 1 in that the end portion 50e of the insulating sheet 50 is secured to the insulating plates 14 with adhesive tapes T. Since the other matters of the secondary battery 100B of this embodiment are similar to those of the secondary battery 100 according to the above-described Embodiment 1, the same reference numerals are attached to the same portions, and their descriptions are omitted.

In the secondary battery 100B of this embodiment, the end portion 50e of the insulating sheet 50 is secured to the insulating plates 14 with the adhesive tapes T. As described above, this can avoid sandwiching the end portion 50e of the insulating sheet 50 adjacent to the battery lid 12 between the battery lid 12 and the battery can 11 when the secondary battery 100B is assembled. Accordingly, similarly to the above-described Embodiment 1, this embodiment can provide the secondary battery 100B that enables the air tightness of the battery container 10 to be ensured with more certainty compared with the conventional one.

As the adhesive tape T, for example, one including an acrylic based adhesive layer on a surface of a resin substrate, such as polyethylene, polypropylene, and polyimide, can be used. The adhesive tapes T are attached on, for example, the side surfaces of the insulating plates 14 opposed to the wide side surfaces 10w of the battery container 10 and the side surfaces of the insulating plates 14 opposed to the narrow side surfaces 10n of the battery container 10. The adhesive tape T may be attached on only the side surfaces of the insulating plates 14 opposed to the narrow side surfaces 10n of the battery container 10, and may be attached on only the side surfaces of the insulating plates 14 opposed to the wide side surfaces 10w of the battery container 10.

Using the adhesive tape T enables the end portion 50e of the insulating sheet 50 to be secured to the insulating plates 14 without heating or pressurizing the insulating sheet 50 and the insulating plates 14. Using the adhesive tape T also enables omitting a step of applying the bonding agent and a step of drying or curing the applied bonding agent. Accordingly, a manufacturing step of the secondary battery 100 can be simplified to improve the productivity of the secondary battery 100.

Embodiment 4

Figure 10:
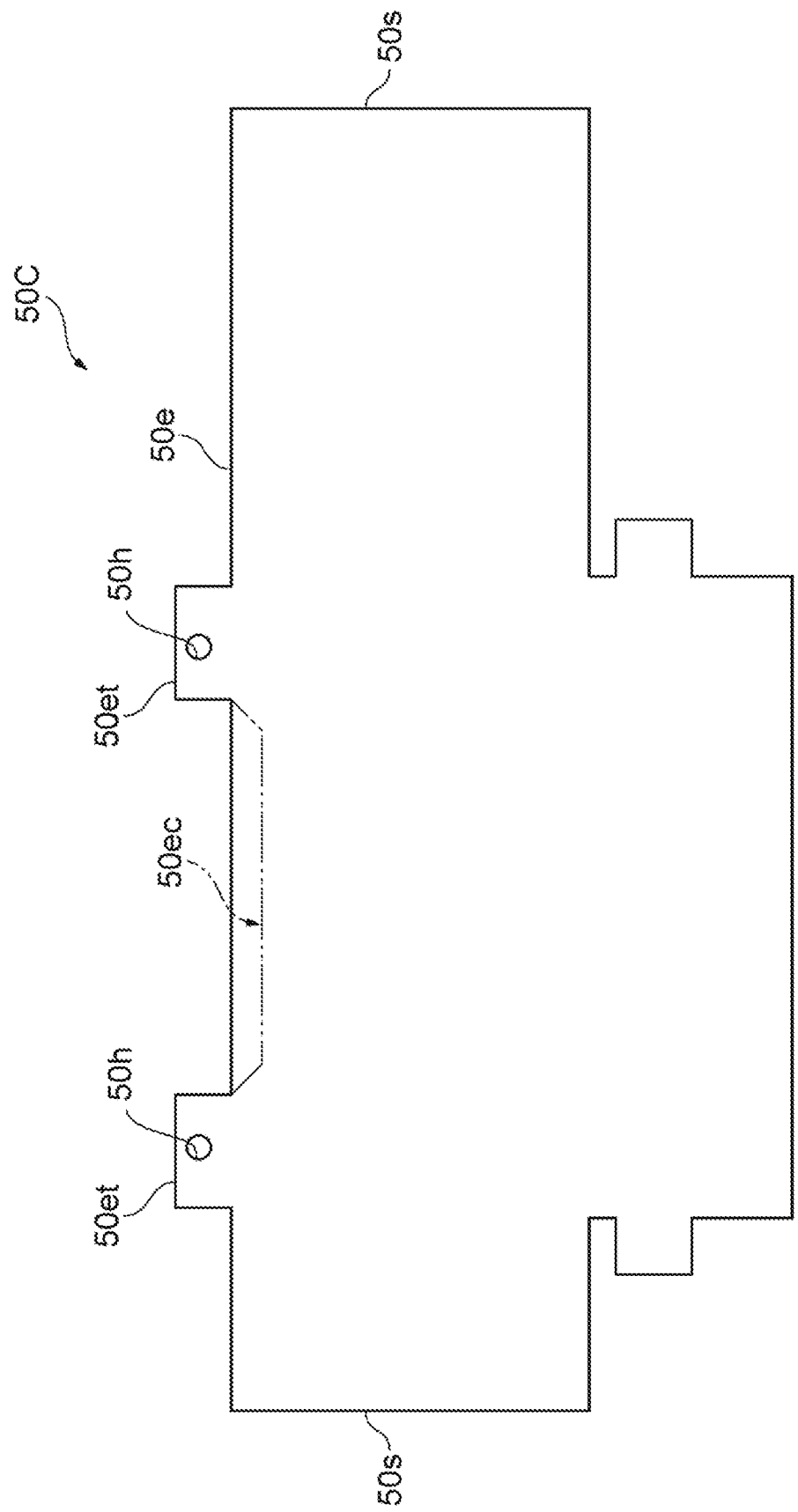
FIG. 10 is a development diagram of an insulating sheet of a secondary battery according to Embodiment 4 of this disclosure.
Figure 11:
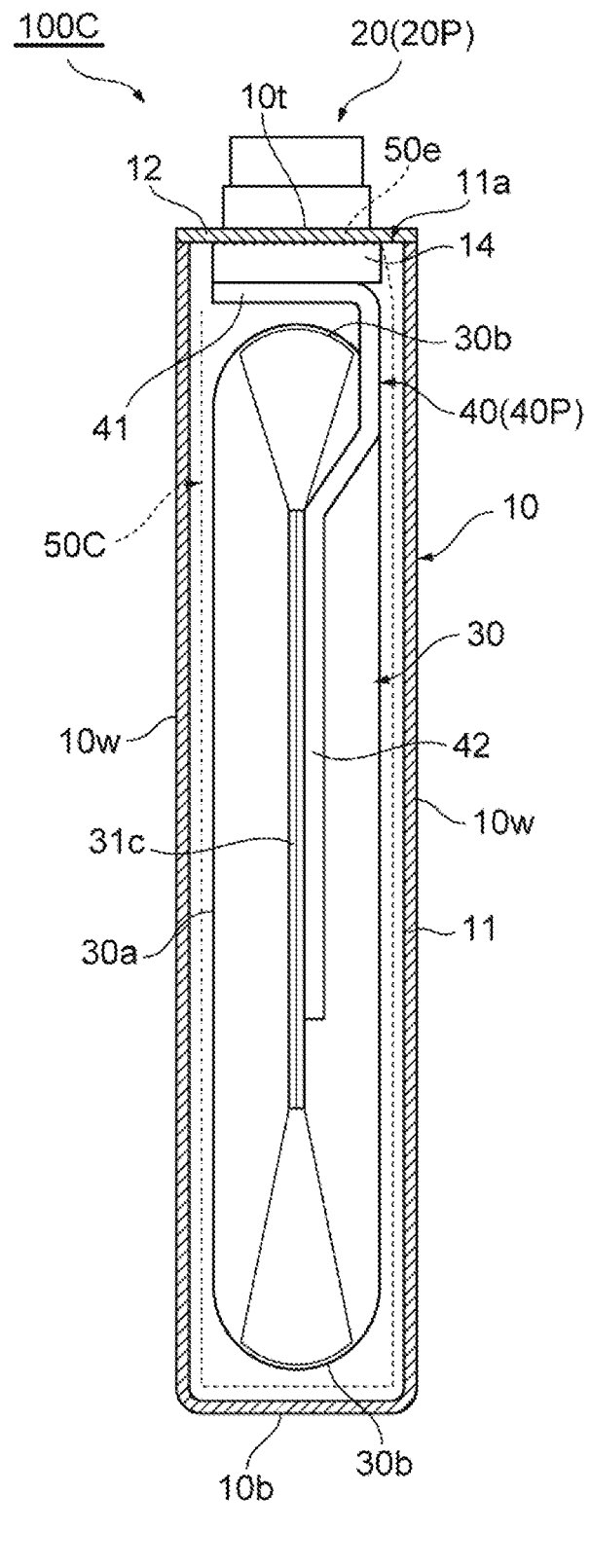
FIG. 11 is a schematic cross-sectional view of the secondary battery according to Embodiment 4 of this disclosure corresponding to FIG. 5.
Figure 12:
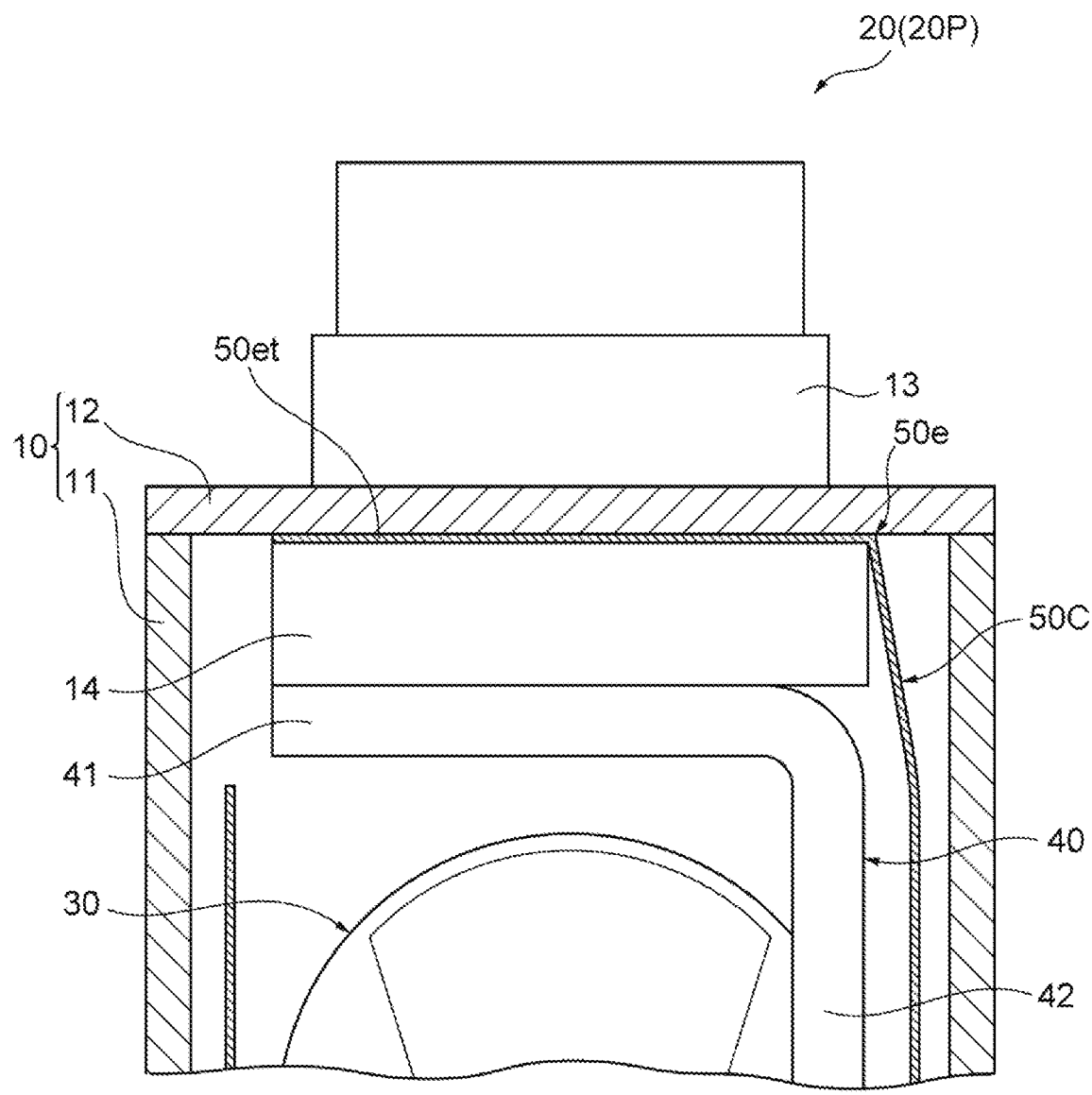
FIG. 12 is an enlarged view of a proximity of an insulating plate of the secondary battery illustrated in FIG. 11.

Next, using FIG. 1 to FIG. 3, Embodiment 4 of the secondary battery of this disclosure will be described with reference to FIG. 10 to FIG. 12. FIG. 10 is a development diagram of an insulating sheet 50C of a secondary battery 100C according to Embodiment 4 of this disclosure. FIG. 11 is a schematic cross-sectional view of the secondary battery 100C according to Embodiment 4 of this disclosure corresponding to FIG. 5. FIG. 12 is an enlarged view of a proximity of the insulating plate 14 of the secondary battery 100C illustrated in FIG. 11.

The secondary battery 100C of this embodiment is different from the secondary battery 100 according to the above-described Embodiment 1 in that the end portion 50e of the insulating sheet 50C is secured to the insulating plates 14 while being sandwiched between the current collector plates 40 and the insulating plates 14 or between the battery lid 12 and the insulating plates 14. Since the other matters of the secondary battery 100C of this embodiment are similar to those of the secondary battery 100 according to the above-described Embodiment 1, the same reference numerals are attached to the same portions, and their descriptions are omitted.

In the secondary battery 100C of this embodiment, as illustrated in FIG. 12, the end portion 50e of the insulating sheet 50C is secured to the insulating plates 14 while being sandwiched between the battery lid 12 and the insulating plates 14. The end portion 50e of the insulating sheet 50C may secured to the insulating plates 14 while being sandwiched between the current collector plates 40 and the insulating plates 14. As described above, such a configuration can secure the end portion 50e of the insulating sheet 50 adjacent to the battery lid 12 to the insulating plates 14 to avoid sandwiching it between the battery lid 12 and the battery can 11 when the secondary battery 100C is assembled. Accordingly, similarly to the above-described Embodiment 1, this embodiment can provide the secondary battery 100C that enables the air tightness of the battery container 10 to be ensured with more certainty compared with the conventional one.

In the secondary battery 100C of this embodiment, for example, as illustrated in FIG. 10, the insulating sheet 50C includes a pair of tab portions 50et disposed in the end portion 50e adjacent to the battery lid 12. The tab portions 50et are disposed to have a tab shape projecting with respect to the other portion of the end portion 50e of the insulating sheet 50. The pair of tab portions 50et are disposed at the interval corresponding to the pair of insulating plates 14. A width in a projection direction of the tab portion 50et is approximately equal to, for example, the width of the insulating plate 14 in the thickness direction (Y-direction) of the secondary battery 100C. A length of the tab portion 50et along the end edge of the end portion 50e of the insulating sheet 50 is approximately equal to, for example, a length of the insulating plate 14 in the width direction (X-direction) of the secondary battery 100C. Such a configuration enables the tab portions 50et, which are disposed on the end portion 50e of the insulating sheet 50, to be sandwiched between the current collector plates 40 and the insulating plates 14 or between the battery lid 12 and the insulating plates 14, thus allowing securing the end portion 50e to the insulating plates 14.

In the secondary battery 100C of this embodiment, the tab portion 50et is provided with, for example, a through hole 50h through which the connecting portion 22 of the external terminal 20 is inserted. This configuration can avoid falling off of the tab portions 50et from between the current collector plates 40 and the insulating plates 14 or between the battery lid 12 and the insulating plates 14, thus allowing securing the end portion 50e of the insulating sheet 50 to the insulating plates 14 with more certainty. Note that the tab portion 50et may be provided with a cutout through which the connecting portion 22 of the external terminal 20 is inserted instead of the through hole 50h. Note that when the tab portion 50et has a narrow width in the projection direction without an interference with the connecting portion 22 of the external terminal 20, the through hole 50h or the cutout through which the connecting portion 22 is inserted does not need to be provided.

In the secondary battery 100C of this embodiment, the end portion 50e of the insulating sheet 50 may be provided with, for example, a depressed cutout portion 50ec between the pair of tab portions 50et. For example, when the pair of tab portions 50et are sandwiched between the current collector plates 40 and the insulating plates 14 or between the battery lid 12 and the insulating plates 14, the end portion 50e of the insulating sheet 50 is possibly flexed between the pair of tab portions 50et. Even in such a case, the cutout portion 50ec between the pair of tab portions 50et can keep the end portion 50e of the insulating sheet 50 away from the battery lid 12. This can avoid sandwiching the end portion 50e of the insulating sheet 50 between the battery can 11 and the battery lid 12 even when the end portion 50e of the insulating sheet 50 is flexed between the pair of tab portions 50et.

As described above, while the embodiments of the secondary battery according to this disclosure has been described in detail using the drawings, the specific configuration is not limited to the embodiment. Design changes and the like within a scope not departing from the gist of this disclosure are included in this disclosure.

REFERENCE SIGNS LIST

11 Battery can
11a Opening
12 Battery lid
14 Insulating plate
20 External terminal
30 Wound body
31 Positive electrode
32 Negative electrode
33 Separator
34 Separator
40 Current collector plate
50 Insulating sheet
50e End portion
50s End portion
100 Secondary battery
100A Secondary battery
100B Secondary battery
1000 Secondary battery
A Bonding portion
T Adhesive tape
W Welding portion

The invention claimed is:

1. A secondary battery comprising:
a wound body in which a positive electrode and a negative electrode are wound with separators interposed;
a respective pair of current collector plates connected to the positive electrode and the negative electrode;
a battery can that houses the wound body and the current collector plates;
a battery lid joined to an opening of the battery can;

a pair of insulating plates disposed between the current collector plates and the battery lid without contacting each other, the pair of insulating plates being disconnected;

an insulating sheet that covers the wound body and the current collector plates inside the battery can; and a pair of external terminals that are connected to the respective current collector plates, pass through the pair of insulating plate and the battery lid, and are exposed to an outside of the battery lid, wherein the insulating sheet has an end portion adjacent to the battery lid and the end portion is secured directly to both insulating plates of the pair of insulating plates.

2. The secondary battery according to claim 1,
wherein the insulating sheet covers the wound body in a circumferential direction of the battery can along an opening edge of the opening and has second end portions in the circumferential direction disposed at positions not to overlap the pair of insulating plates.

3. The secondary battery according to claim 1,
wherein the insulating sheet covers the wound body over a whole circumference in a circumferential direction of the battery can along an opening edge of the opening, and second end portions in the circumferential direction mutually overlap.

4. The secondary battery according to claim 2 or claim 3,
wherein the insulating sheet has a plurality of partial insulating sheets.

5. The secondary battery according to claim 1,
wherein the end portion of the insulating sheet is secured to at least one of the pair of insulating plates via a welding portion.

6. The secondary battery according to claim 1,
wherein the end portion of the insulating sheet is secured to at least one of the pair of insulating plates via a bonding portion.

7. The secondary battery according to claim 1,
wherein the end portion of the insulating sheet is secured to at least one of the pair of insulating plates with an adhesive tape.

8. The secondary battery according to claim 1,
wherein the end portion of the insulating sheet is sandwiched between the current collector plates and the pair of insulating plates or between the battery lid and the pair of insulating plates.

9. A secondary battery comprising:
a wound body in which a positive electrode and a negative electrode are wound with separators interposed;
a respective pair of current collector plates connected to the positive electrode and the negative electrode;
a battery can that houses the wound body and the current collector plates;
a battery lid joined to an opening of the battery can;
a pair of insulating plates disposed between the current collector plates and the battery lid without contacting each other, the pair of insulating plates being disconnected;

an insulating sheet having a first end portion adjacent to the battery lid and a pair of second end portions that are wound around the wound body in a circumferential direction to cover the wound body and the current collector plates inside the battery can; and a pair of external terminals that are connected to the respective current collector plates, pass through the pair of insulating plate and the battery lid, and are exposed to an outside of the battery lid, wherein the first end portion of the insulating sheet is secured to the pair of insulating plates, and the pair of second end portions of the insulating sheet overlap.

10. The secondary battery according to claim 9,
wherein the insulating sheet covers the wound body over a whole circumference in the circumferential direction of the battery can along an opening edge of the opening, and the second end portions mutually overlap.

11. A secondary battery comprising:
a wound body in which a positive electrode and a negative electrode are wound with separators interposed;
a respective pair of current collector plates connected to the positive electrode and the negative electrode;
a battery can that houses the wound body and the current collector plates;
a battery lid joined to an opening of the battery can;
a pair of insulating plates disposed between the current collector plates and the battery lid without contacting each other, the pair of insulating plates being disconnected and located on opposite ends of the battery lid;
an insulating sheet that covers the wound body and the current collector plates inside the battery can; and
a pair of external terminals that are connected to the respective current collector plates, pass through the insulating plate and the battery lid, and are exposed to an outside of the battery lid,
wherein the insulating sheet has an end portion positioned adjacent to the battery lid and between at least one of the current collector plates and the battery lid, the end portion is secured to the pair of insulating plates.

12. The secondary battery according to claim 11,
wherein the end portion of the insulating sheet is sandwiched between the battery lid and the insulating plate.

13. The secondary battery according to claim 11,
wherein the insulating sheet defines a through hole that one of the external terminals passes through.

14. The secondary battery according to claim 11,
wherein the insulating sheet defines a pair of through holes each receiving one of the external terminals.

* * * * *